United States Patent
Im et al.

(10) Patent No.: US 8,649,826 B2
(45) Date of Patent: Feb. 11, 2014

(54) MOBILE DEVICE AND CONTROL METHOD THEREOF

(75) Inventors: Ki-hong Im, Suwon-si (KR); Jeong-yun Kim, Suwon-si (KR); Hyun-gyoo Yook, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/957,959

(22) Filed: Dec. 1, 2010

(65) Prior Publication Data

US 2011/0130173 A1    Jun. 2, 2011

Related U.S. Application Data

(60) Provisional application No. 61/265,939, filed on Dec. 2, 2009, provisional application No. 61/265,923, filed on Dec. 2, 2009.

(30) Foreign Application Priority Data

Nov. 17, 2010  (KR) .......................... 10-2010-0114478

(51) Int. Cl.
  *H04W 88/02*  (2009.01)
(52) U.S. Cl.
  USPC ........... 455/567; 345/173; 345/419; 715/702; 455/418; 455/557; 710/62; 710/58
(58) Field of Classification Search
  USPC ............. 455/567, 90.2, 566, 550.1, 418, 557, 455/414.1; 340/407.1, 407.2; 345/156, 173; 715/702, 701; 710/58, 62
  See application file for complete search history.

(56) References Cited

U.S. PATENT DOCUMENTS

| | | | | |
|---|---|---|---|---|
| 6,131,097 | A * | 10/2000 | Peurach et al. ....................... 1/1 |
| 6,175,789 | B1 | 1/2001 | Beckert et al. |
| 7,446,752 | B2 * | 11/2008 | Goldenberg et al. ......... 345/156 |
| 2001/0035854 | A1 * | 11/2001 | Rosenberg et al. ........... 345/156 |
| 2003/0046401 | A1 * | 3/2003 | Abbott et al. .................. 709/228 |
| 2003/0174121 | A1 * | 9/2003 | Poupyrev et al. ............. 345/156 |
| 2004/0233167 | A1 * | 11/2004 | Braun et al. .................. 345/163 |
| 2005/0195390 | A1 | 9/2005 | Jeon et al. |
| 2006/0109266 | A1 * | 5/2006 | Itkowitz et al. ............... 345/419 |
| 2006/0248183 | A1 * | 11/2006 | Barton ......................... 709/224 |
| 2006/0288329 | A1 | 12/2006 | Gandhi et al. |
| 2007/0005835 | A1 * | 1/2007 | Grant et al. ..................... 710/62 |
| 2007/0011665 | A1 | 1/2007 | Gandhi et al. |
| 2007/0146316 | A1 * | 6/2007 | Poupyrev et al. ............. 345/156 |
| 2007/0198360 | A1 * | 8/2007 | Rogers et al. .................... 705/26 |
| 2008/0036591 | A1 | 2/2008 | Ray |
| 2008/0117175 | A1 * | 5/2008 | Linjama et al. ............... 345/173 |
| 2008/0122315 | A1 * | 5/2008 | Maruyama et al. ........... 310/314 |
| 2008/0153554 | A1 * | 6/2008 | Yoon et al. .................... 455/567 |
| 2008/0198139 | A1 * | 8/2008 | Lacroix et al. ................ 345/173 |
| 2009/0096632 | A1 * | 4/2009 | Ullrich et al. .............. 340/825.2 |
| 2011/0191674 | A1 * | 8/2011 | Rawley et al. ................ 715/702 |

* cited by examiner

OTHER PUBLICATIONS

International Search Report issued Aug. 30, 2011 by the International Searching Authority in counterpart Korean Patent Application No. PCT/KR2010/008603.

*Primary Examiner* — Mahendra Patel
(74) *Attorney, Agent, or Firm* — Sughrue Mion, PLLC

(57) ABSTRACT

The mobile device for providing a haptic function includes a vibration unit which generates vibration for a tactile effect as the haptic function; and a control unit which includes a platform providing an application programming interface (API) corresponding to the haptic function and having a plurality of parameters, executes an application prepared by the API, determines a characteristic of the vibration based on the plurality of parameters set up in the application, and controls the vibration unit to generate the vibration having the determined characteristic.

17 Claims, 3 Drawing Sheets

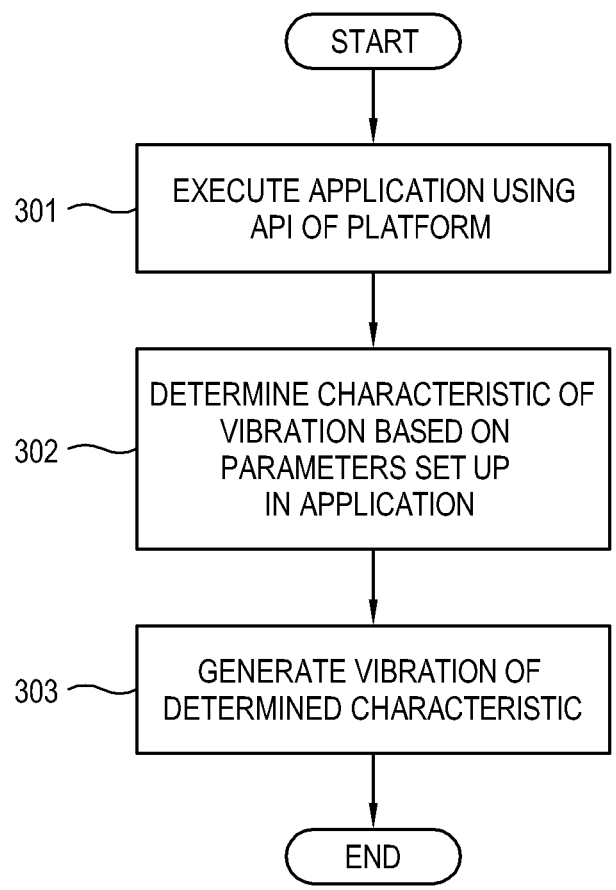

MOBILE DEVICE AND CONTROL METHOD THEREOF

CROSS-REFERENCE TO RELATED APPLICATIONS

This application claims priority from U.S. Provisional Application Nos. 61/265,923 and 61/265,939, filed Dec. 2, 2009, and Korean Patent Application No. 10-2010-0114478 filed Nov. 17, 2010, in the Korean Intellectual Property Office, the disclosures of which are incorporated herein by reference in their entireties.

BACKGROUND

1. Field

Apparatuses and methods consistent with exemplary embodiments relate to a mobile device and a control method thereof, and more particularly, to a mobile device capable of providing a haptic function and a control method thereof.

2. Description of the Related Art

A mobile device such as a cellular phone, a smart phone, a tablet personal computer (PC), etc. interfaces with a user through various methods such as a visual method, an auditory method, etc. Such an interface method includes a tactile method. For example, the mobile device reacts to a user's manipulation or operation and vibrates so that the user can feel tactile feedback which is referred to as haptic or haptic function.

A related art mobile device provides the haptic function in only a simple form where the mobile device vibrates when a user touches a screen or when there is a phone call. Accordingly, it is desirable to provide the haptic function in more various forms to satisfy a demand of a user who wants more sensitive functions.

Meanwhile, various functions provided by a mobile device are achieved by software applications. For example, a user may download an application related to a desired function from a network or the like and install it on the mobile device to use the function. However, an operating system (OS), a platform, etc. of the related art mobile device does not support various haptic functions needed for such an application.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

One or more exemplary embodiments provide a mobile device capable of providing a haptic function to satisfy a demand of a user who wants a more sensitive function, and a control method thereof.

Exemplary embodiments also provide a mobile device capable of supporting a function needed for an application to achieve a haptic function satisfying a user's demand, and a control method thereof.

According to an aspect of an exemplary embodiment, there is provided a mobile device providing a haptic function, the mobile device including a display unit which displays an image; a user input unit which receives an input of a user; a vibration unit which generates vibration for a tactile effect as the haptic function; and a control unit which includes a platform providing an application programming interface (API) corresponding to the haptic function and having a plurality of parameters, executes an application prepared by the API, determines a characteristic of the vibration on the basis of the plurality of parameters set up in the application, and controls the vibration unit to generate vibration having the determined characteristics.

The characteristic of the vibration may include at least one of a state, style and type of the vibration.

Each of the plurality of parameters may include a value for determining at least one of strength, time and frequency characteristics of the vibration.

The application may be downloaded from an exterior and installed.

According to another aspect of an exemplary embodiment, there is provided a control method of a mobile device providing a haptic function, the control method including executing an application prepared by an API that is provided by a platform of the mobile device, has a plurality of parameters, and corresponds to the haptic function; determining a characteristic of vibration for a tactile effect as the haptic function on the basis of the plurality of parameters set up in the application; and generating vibration having the determined characteristic.

The characteristic of the vibration may include at least one of a state, style and type of the vibration.

Each of the plurality of parameters may include a value for determining at least one of strength, time and frequency characteristics of the vibration.

The application may be downloaded from an exterior and installed.

BRIEF DESCRIPTION OF THE DRAWINGS

The above and/or other aspects will become more apparent from the following description of exemplary embodiments, taken in conjunction with the accompanying drawings, in which:

FIG. 3 is a flowchart showing operation of the mobile device according to an exemplary embodiment.

DETAILED DESCRIPTION OF EXEMPLARY EMBODIMENTS

Figure 1:
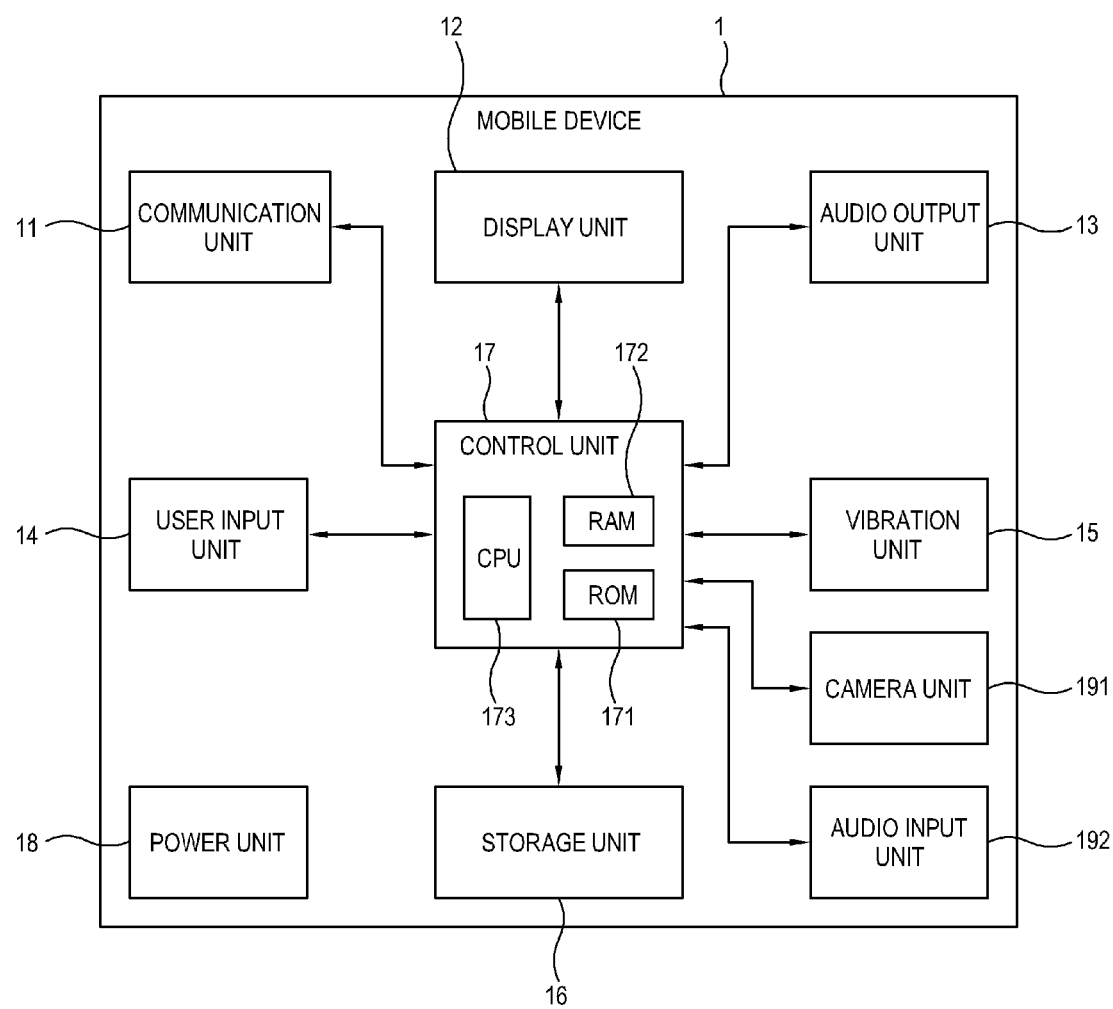
FIG. 1 is a block diagram showing a configuration of a mobile device according to an exemplary embodiment.

Certain exemplary embodiments are described in greater detail below with reference to accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram showing a configuration of a mobile device according to an exemplary embodiment. The mobile device 1 shown in FIG. 1 may include, for example, a cellular phone, a smart phone, a tablet personal computer (PC), etc. The mobile device 1 may include a communication unit 11, a display unit 12, an audio output unit 13, a user input unit 14, a vibration unit 15, a storage unit 16, a control unit 17, a power unit 18, a camera unit 191 and an audio input unit 192.

The communication unit 11 performs communication through a network. The contents and type of the communication performed by the communication unit 11 may vary depending on use and function of the mobile device 1. For example, in the case of a telephone function, the communication unit 11 calls the other device (not shown) for telephone conversation. In the case of an Internet function, the communication unit 11 performs Internet connection with a predetermined server (not shown) for transmitting/receiving data. Further, the communication unit 11 may perform communication with a peripheral device (not shown) through local communication such as Bluetooth, WiFi, etc.

The display unit 12 displays an image representing the operation or state of the mobile device 1. The display unit 12 may display an image by using various display devices including, for example, a liquid crystal display (LCD), an organic light emitting device (OLED), etc. The audio output unit 13 outputs an audio representing the operation or state of the mobile device 1. The audio output unit 13 may include an audio processor (not shown) that processes an audio signal, and a loudspeaker (not shown) that outputs an audio based on an audio signal.

The user input unit 14 receives a user's command. The user input unit 14 may receive a user's command in various forms, which may include a key input unit (not shown) that receives a user's command by a key input, and a touch input unit (not shown) that receives a user's command by a touch input. A touch input unit may include a touch screen provided in the display unit 12.

The vibration unit 15 generates vibration for a tactile effect to achieve a haptic function. The vibration generated by the vibration unit 15 may have various characteristics. The characteristics of the vibration may be controlled by the control unit 17.

The storage unit 16 is a non-volatile memory including, for example, a flash memory, a hard disk drive, etc., which stores data or programs needed for operating the mobile device 1. The power unit 18 supplies power for operating the mobile device 1. The camera unit 191 takes an image, and the audio input unit 192 may include a microphone or the like and receives an audio. Some of the above-described elements, such as for example, the camera unit 191, may be omitted from the mobile device 1 in consideration of its function or use.

Figure 2:
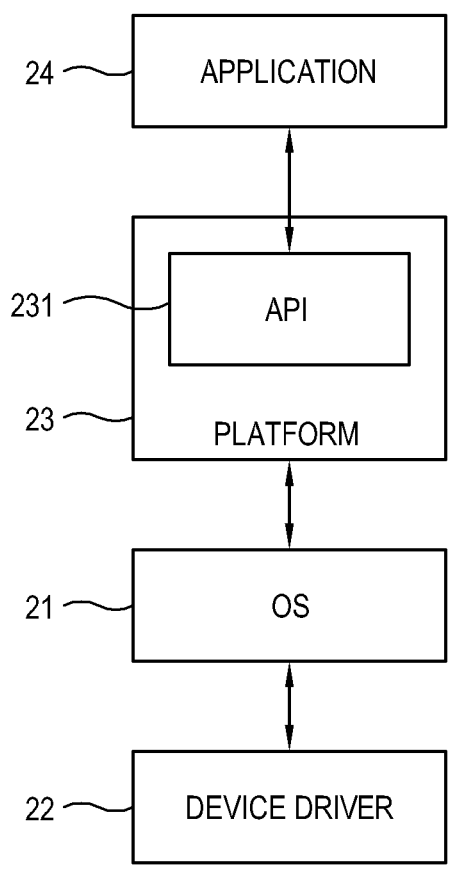
FIG. 2 is a block diagram showing a configuration of software of the mobile device of FIG. 1.

The control unit 17 controls the operation of the elements in the mobile device 1. The control unit 17 may include a read only memory (ROM) 171 where a control program for performing various operations may be stored, a random access memory (RAM) 172 where the control program is at least partially loaded, and a central processing unit (CPU) 173 which executes the loaded control program. The control program of the control unit 17 may be stored in the storage unit 16 as well as in the ROM 171. The control program of the control unit 17 may include a plurality of programs. FIG. 2 is a block diagram showing an exemplary configuration of the control program in the control unit 17.

As shown in FIG. 2, the control program of the control unit 17 may include an OS 21, a device driver 22, a platform 23, and an application 24. The OS 21 manages and controls overall operations of the mobile device 1. The device driver 22 performs an interface between a hardware device such as the vibration unit 15 or the like and the OS 21. The platform 23 performs an interface between the OS 21 and the application 24, and includes an API 231 for supporting the application 24. The application 24 performs at least one function, and may be prepared using the API 231 of the platform 23. The function performed by the application 24 includes the haptic function. The application 24 may be transmitted from the external device through the communication unit 11 and installed on the mobile device 1. That is, a user can download the application 24 via the Internet or the like and install it on the mobile device 1.

The API 231 of the platform 23 includes an API for the haptic function. In this exemplary embodiment, the API for the haptic function includes a plurality of parameters. The plurality of parameters corresponds to the vibration characteristics for the haptic function. In the application 24, the plurality of API parameters is set up for the haptic function. When the application 24 is executed, the control unit 17 analyzes the plurality of parameters set up in the application 24 and determines the characteristics of the vibration, thereby controlling the vibration unit 15 to generate vibration corresponding to the determined characteristics.

According to an exemplary embodiment, the characteristics of the vibration may include at least one of the state, style, and type of the vibration for the haptic function. Below, Table 1 shows an example of the vibration characteristics.

TABLE 1

| Vibration State | Vibration Style | Vibration Type |
|---|---|---|
| Not Playing | Smooth | Periodic |
| Playing | Strong | Magsweep |
| Paused | Sharp | Timeline |
| | | Streaming |

As shown in Table 1, the plurality of parameters may be used in determining the state, style, and type of the vibration. In this exemplary embodiment, the plurality of parameters may include information about strength, time and frequency characteristics of the vibration. Table 2 shows an example of various parameters for determining the strength, time, and frequency characteristics of the vibration variously.

TABLE 2

| Parameters |
|---|
| AttackLevel |
| AttackTime |
| Duration |
| Fadelevel |
| FadeTime |
| Magnitude |
| Period |
| Speed |
| Style |

It is possible to achieve the state, style and type of the vibration in various forms as shown in Table 1 by setting up values of many parameters shown in Table 2 variously and combining all or some of them.

In accordance with this exemplary embodiment, the values of at least some of the parameters shown in Table 2 are set up in the application 24, and thus vibration having a characteristic determined on the basis of the setup parameters is generated when the application 24 is executed. Accordingly, it is possible to achieve various types of vibration as the haptic function, so that a user who wants more sensitive effects can be further satisfied. Also, it is possible to provide the haptic function in various forms by the API 231 of the platform 23, so that the application 24 for achieving an enhanced haptic function can be more actively developed.

FIG. 3 is a flowchart showing operation of the mobile device 1 according to an exemplary embodiment. At operation 301, the application 24 prepared by the API 231 of the platform 23 is executed. At operation 302, the characteristic of the vibration is determined by analyzing the plurality of parameters corresponding to the haptic function while the application 24 is executed. At operation 303, the vibration having the determined characteristic is generated.

As described above, in accordance with an exemplary embodiment, it is possible to provide a haptic function which can satisfy a demand of a user who wants a more sensitive function.

It is also possible to support a function needed for an application to achieve a haptic function satisfying a user's demand.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile device for providing a haptic function, the mobile device comprising:
   a vibration unit which generates vibration for a tactile effect as the haptic function; and
   a control unit which comprises a platform providing an application programming interface (API) corresponding to the haptic function, which executes an application prepared by the API that is downloaded from an external device and is installed on the mobile device, and which analyzes a plurality of parameters provided by the executed application to the API; and which comprise at least two values indicating at least two of a strength, a time period, and a frequency attribute of the vibration; and determines a characteristic of the vibration provided by the mobile device based on the analyzed plurality of parameters set up in the application, and controls the vibration unit to generate the vibration having the determined characteristic,
   wherein the application provides a function supplemented with the at least one haptic function described by the plurality of parameters, and
   wherein the haptic function is performed when the application is executed.

2. The mobile device according to claim 1, wherein the characteristic of the vibration comprises at least one of a state, a style, and a type of the vibration.

3. The mobile device according to claim 1, wherein the plurality of parameters comprise a value indicating strength of the vibration, a value indicating time period of the vibration, and a value indicating a frequency characteristic of the vibration.

4. A control method for a mobile device which provides a haptic function, the control method comprising:
   downloading an application from an external device;
   installing the downloaded application on the mobile device,
   executing the installed application prepared by an application programming interface (API) that is provided by a platform of the mobile device, and corresponds to the haptic function;
   analyzing a plurality of parameters provided by the executed application to the API and which comprise at least two values indicating at least two of a strength, a time period, and a frequency attribute of the vibration;
   determining a characteristic of vibration for a tactile effect as the haptic function based on the analyzed parameters set up in the application; and
   generating the vibration having the determined characteristic,
   wherein the application provides a function supplemented with the at least one haptic function described by the plurality of parameters, and
   wherein the haptic function is performed when the application is executed.

5. The control method according to claim 4, wherein the characteristic of the vibration comprises at least one of a state, a style, and a type of the vibration.

6. The control method according to claim 4, wherein the plurality of parameters comprises a value indicating a strength of the vibration, a value indicating time period of the vibration, and a value indicating a frequency characteristic of the vibration.

7. The mobile device according to claim 1, further comprising:
   a display unit which displays an image; and
   a user input unit which receives an input of a user.

8. A control method comprising:
   downloading the application from an external device;
   installing the application, which provides a haptic function, on a mobile device;
   providing, on the mobile device, an application programming interface (API);
   executing the application by the API;
   analyzing a plurality of parameters set up in the application and provided by the executed application to the API, which comprise at least two values indicating at least two of a strength, a time period, and a frequency attribute of the vibration;
   determining a characteristic of vibration for a tactile effect as the haptic function based on the analyzed parameters; and
   generating the vibration having the determined characteristic,
   wherein the application provides a function supplemented with the at least one haptic function described by the plurality of parameters, and
   wherein the haptic function is performed when the application is executed.

9. The control method according to claim 8, wherein the characteristic of the vibration comprises at least one of a state, a style, and a type of the vibration.

10. The control method according to claim 8, wherein the plurality of parameters comprise a value indicating a strength of the vibration, a value indicating time period of the vibration, and a value indicating a frequency characteristic of the vibration.

11. The device of claim 1, wherein the characteristics of the vibration comprise at least two of a state, a style, and a type of the vibration.

12. The device of claim 1, wherein:
   the characteristics of the vibration comprise at least one of a state, a, style, and a type of the vibration,
   the style is selected from one of a smooth vibration, a strong vibration, and a sharp vibration,
   the state is selected from one of not playing, playing, and paused, and
   the type is selected from one of a periodic vibration, a magsweep vibration, a timeline vibration, and a streaming vibration.

13. The device of claim 1, wherein the plurality of parameters comprises a value for determining at least one of attach level, attach time, duration, fade level, fade time, magnitude, period, speed, and style.

14. The device of claim 1, wherein an API platform interface performs an interface between an operation system and the application and comprises the API for supporting the installed application to generate the haptic function.

15. The control method according to claim 4, wherein an API platform interface performs an interface between an operation system and the application and comprises the API for supporting the installed application to generate the haptic function.

16. The control method according to claim 8, wherein an API platform interface performs an interface between an operation system and the application and comprises the API for supporting the installed application to generate the haptic function.

17. A mobile device for providing a haptic function, the mobile device comprising:
   a vibration unit which generates vibration for a tactile effect as the haptic function; and
   a control unit which comprises a platform providing an application programming interface (API) corresponding to the haptic function, which executes an application prepared by the API that is downloaded from an external device and is installed on the mobile device, and which analyzes a plurality of parameters provided by the executed application to the API; and which comprise at least two values indicating at least two of a strength, a time period, and a frequency attribute of the vibration; and determines a characteristic of the vibration provided by the mobile device based on the analyzed plurality of parameters set up in the application, and controls the vibration unit to generate the vibration having the determined characteristic,
wherein:
   the style is selected from one of a smooth vibration, a strong vibration, and a sharp vibration,
   the state is selected from one of not playing, playing, and paused, and
   the type is selected from one of a periodic vibration, a magsweep vibration, a timeline vibration, and a streaming vibration, and
   the characteristic of the vibration comprises at least two of a state, a style, and a type of the vibration,
wherein the application provides a function supplemented with the at least one haptic function described by the plurality of parameters, and
wherein the haptic function is performed when the application is executed.

* * * * *